No. 724,400. PATENTED MAR. 31, 1903.
F. W. SCHIRMER.
DRIVE CHAIN.
APPLICATION FILED APR. 4, 1902.
NO MODEL.
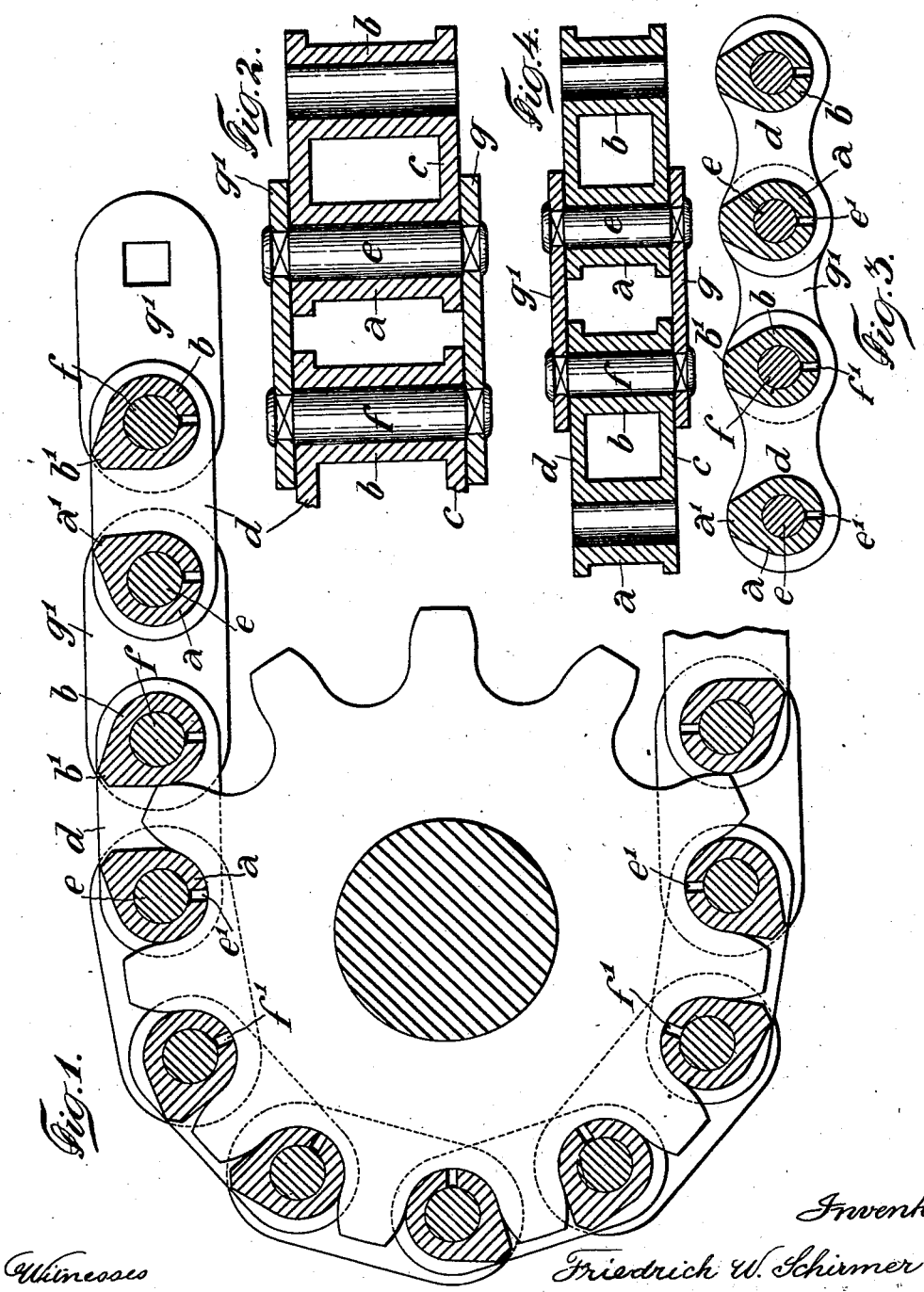
Witnesses
Chas H. Smith
J. Staib
Inventor
Friedrich W. Schirmer
per L. W. Serrell & Son
attys

UNITED STATES PATENT OFFICE.

FRIEDRICH WILHELM SCHIRMER, OF AUBONNE, SWITZERLAND, ASSIGNOR TO THE FIRMS OF PERROT-DUVAL & CO., OF GENEVA, SWITZERLAND, AND COMPTOIR INDUSTRIEL DE BERNE A. SCHOPFER, OF BERNE, SWITZERLAND.

DRIVE-CHAIN.

SPECIFICATION forming part of Letters Patent No. 724,400, dated March 31, 1903.

Application filed April 4, 1902. Serial No. 101,317. (No model.)

*To all whom it may concern:*

Be it known that I, FRIEDRICH WILHELM SCHIRMER, of Aubonne, canton of Vaud, Switzerland, have invented an Improvement in Drive-Chains, of which the following is a specification.

My invention relates to certain improvements in and relating to drive-chains; and the object of the same is to provide a drive-chain of practical strength and durability at a lower price and with less material than has been possible in the manufacture of the well-known drive-chains.

My improved drive-chain is especially intended for use in connection with cycles and motor-cars; but it may of course be employed for any other power-transmitting purpose whatsoever.

My improved drive-chain is composed of a series of closed links connected by longitudinal links of usual form and pins passing through the parts. Each closed link is composed of two tubular cylindrical cross-bars and two parallel longitudinal bars integral therewith and extending between the ends thereof, and each cross-bar is made with a surface projection or rib longitudinally thereof.

In the drawings, Figure 1 is a side elevation and partial section of a chain constructed according to my invention and a chain-wheel having an odd number of teeth. Fig. 2 is a longitudinal section of part of the chain shown in Fig. 1. Fig. 3 is a side elevation and partial section of part of a chain, illustrating a modification of my invention; and Fig. 4 is a longitudinal section of the part of the chain shown in Fig. 3.

Referring to Figs. 1 and 2 of the drawings, the main links of the chain are composed of two tubular cylindrical cross-bars $a$ and $b$, each having a longitudinal surface rib $a'$ $b'$, which greatly reinforces the same and meshes with the teeth of the sprocket over which the chain runs, and the said cross-bars $a$ and $b$ are connected with one another by side bars $c$ and $d$, made integral with the cross-bars, and the said side bars extend beyond the said tubular cross-bars $a$ and $b$, so that a space between the extending portions of the side bars between every two links is of precisely the same width as the opening in any given link. This feature prevents the chain from wabbling and insures smooth running of the same over the sprocket. Pins $e$ and $f$ fit within and pass through the said cross-bars $a$ and $b$, and the heads of the pins are riveted to the connecting-links $g$ and $g'$, which are of usual construction. The said cross-bars $a$ and $b$ are also provided with holes $e'$ and $f'$, which are employed for purposes of lubrication.

In the above-described construction the ribs $a'$ and $b'$ are of such form that a portion of their flat faces will engage the upper portion of the teeth of the sprocket-wheel, which causes the wear on the sprocket-wheel to be on the upper portions of the teeth as well as at their bases, whereas usually this wear occurs almost entirely at the bases of the teeth.

In the construction shown in Figs. 3 and 4 the main or active links of the chain are similar to those shown in Figs. 1 and 2, except that the ribs $a'$ and $b'$ of the cross-bars $a$ and $b$ are set in another position in regard to the longitudinal axis of the chain, the planes of said ribs being at right angles to said chain-axis instead of at an acute angle to themselves and to the axis of the link, as in the first-described construction.

I claim as my invention—

1. A drive-chain comprising series of closed links, each of which links is composed of two tubular cylindrical cross-bars having longitudinal ribs on one side thereof, and side bars extending between and at the ends of said cross-bars, and said side bars extending beyond the tubular cross-bars so as to form a space between the said extended portions between every two links of precisely the same width as the opening in any given link and all said parts being integral, connecting-links and pins passing through said cylindrical cross-bars and the ends of the said connecting-links, whereby the smooth running of the chain over the sprocket is insured and wabbling prevented, substantially as specified.

2. A drive-chain comprising series of closed links, each of which links is composed of two tubular cylindrical cross-bars having longitudinal ribs on one side thereof, the planes of said ribs on each link being at an acute angle with each other and with the axis of the link, side bars extending between and at the ends of said cross-bars, the said side bars extending beyond the tubular cross-bars so as to form a space between the said extended portions between every two links of precisely the same width as the opening in any given link and all said parts being integral, connecting-links and pins passing through said cylindrical cross-bars and the ends of the said connecting-links, whereby the smooth running of the chain over the sprocket is insured and wabbling prevented, substantially as set forth.

In testimony that I claim the foregoing as my invention I have signed my name in presence of two subscribing witnesses.

FRIEDRICH WILHELM SCHIRMER.

Witnesses:
E. IMER-SCHNEIDER,
CH. IMER.